US011385045B2

(12) United States Patent
Bourne et al.

(10) Patent No.: US 11,385,045 B2
(45) Date of Patent: *Jul. 12, 2022

(54) ADAPTIVE CONTROL OF COATING THICKNESS

(71) Applicant: Rolls-Royce North American Technologies, Inc., Indianapolis, IN (US)

(72) Inventors: Keith Bourne, Chester, VA (US); Matthew R. Gold, Carmel, IN (US); Marshall Louis Sweet, Avon, IN (US); Frol Periverzov, Chester, VA (US); Benjamin Zimmerman, Moseley, VA (US)

(73) Assignee: ROLLS-ROYCE NORTH AMERICAN TECHNOLOGIES, INC., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/206,455

(22) Filed: Mar. 19, 2021

(65) Prior Publication Data
US 2021/0207947 A1 Jul. 8, 2021

Related U.S. Application Data

(62) Division of application No. 16/054,651, filed on Aug. 3, 2018, now Pat. No. 10,976,154.
(Continued)

(51) Int. Cl.
*G01B 11/06* (2006.01)
*G01B 21/08* (2006.01)
(Continued)

(52) U.S. Cl.
CPC ........ *G01B 11/0683* (2013.01); *B05B 1/3033* (2013.01); *B05B 7/226* (2013.01);
(Continued)

(58) Field of Classification Search
CPC .................. B05B 12/084; B05B 13/0431
See application file for complete search history.

(56) References Cited

U.S. PATENT DOCUMENTS

2011/0276166 A1* 11/2011 Atanasoff .......... G01B 11/0625
700/104
2012/0156362 A1* 6/2012 Sadovoy ................ B25J 9/1671
427/9
(Continued)

FOREIGN PATENT DOCUMENTS

DE 102014220180 A1 6/2016
WO 2017032518 A1 3/2017

OTHER PUBLICATIONS

Antonio et al., "A Framework for Optimal Trajectory Planning for Automated Spray Coating", International Journal of Robotics and Automation, vol. 12, No. 4, 1997, 11 pgs., Applicant points out, in accordance with MPEP 609.04(a), that the year of publication, 1997, is sufficiently earlier than the effective U.S. filing date, 2018 so that the particular month of publication is not in issue.
(Continued)

*Primary Examiner* — Nathan T Leong
(74) *Attorney, Agent, or Firm* — Shumaker & Sieffert, P.A.

(57) ABSTRACT

An example method that includes receiving, by a computing device, a geometry of the component that includes a plurality of locations on a surface of the component; determining, by the computing device, a respective target thickness of the coating for each respective location of the plurality of locations based on a target coated component geometry and the geometry of the component; and determining, by the computing device, a number of passes or velocity of a coating device for each respective position of a plurality of positions to achieve the respective target thickness for each respective location.

9 Claims, 4 Drawing Sheets

Related U.S. Application Data

(60) Provisional application No. 62/541,397, filed on Aug. 4, 2017, provisional application No. 62/541,394, filed on Aug. 4, 2017.

(51) Int. Cl.

| | |
|---|---|
| *B05B 13/04* | (2006.01) |
| *B05B 12/04* | (2006.01) |
| *B05B 7/22* | (2006.01) |
| *G01B 11/24* | (2006.01) |
| *B05B 16/00* | (2018.01) |
| *C23C 4/12* | (2016.01) |
| *C23C 24/04* | (2006.01) |
| *B05B 12/00* | (2018.01) |
| *B05B 12/12* | (2006.01) |
| *F01D 5/28* | (2006.01) |
| *B05B 12/08* | (2006.01) |
| *C23C 4/00* | (2016.01) |
| *B05B 1/30* | (2006.01) |
| *G06F 17/17* | (2006.01) |
| *C23C 4/134* | (2016.01) |
| *C23C 4/04* | (2006.01) |
| *C23C 4/131* | (2016.01) |
| *B05B 7/00* | (2006.01) |
| *B05B 7/20* | (2006.01) |
| *G01B 21/20* | (2006.01) |

(52) U.S. Cl.
CPC ............ *B05B 12/004* (2013.01); *B05B 12/04* (2013.01); *B05B 12/084* (2013.01); *B05B 12/122* (2013.01); *B05B 13/0431* (2013.01); *B05B 16/00* (2018.02); *C23C 4/00* (2013.01); *C23C 4/12* (2013.01); *C23C 24/04* (2013.01); *F01D 5/284* (2013.01); *F01D 5/288* (2013.01); *G01B 11/24* (2013.01); *G01B 21/08* (2013.01); *G06F 17/17* (2013.01); *B05B 7/0006* (2013.01); *B05B 7/20* (2013.01); *B05B 7/222* (2013.01); *C23C 4/04* (2013.01); *C23C 4/131* (2016.01); *C23C 4/134* (2016.01); *F05D 2230/90* (2013.01); *F05D 2300/6033* (2013.01); *F05D 2300/611* (2013.01); *G01B 21/20* (2013.01)

(56) References Cited

U.S. PATENT DOCUMENTS

| | | | |
|---|---|---|---|
| 2015/0140199 A1* | 5/2015 | Borchardt | .............. B05B 12/00 427/8 |
| 2015/0315714 A1 | 11/2015 | Vijay et al. | |
| 2019/0039082 A1 | 2/2019 | Bourne et al. | |
| 2019/0039083 A1 | 2/2019 | Bourne et al. | |
| 2019/0039084 A1 | 2/2019 | Bourne et al. | |
| 2019/0041192 A1 | 2/2019 | Bourne et al. | |

OTHER PUBLICATIONS

Antonio, "Optimal Trajectory Planning for Spray Coating", 1994, IEEE, 8 pgs., Applicant points out, in accordance with MPEP 609.04(a), that the year of publication, 1994, is sufficiently earlier than the effective U.S. filing date, 2018 so that the particular month of publication is not in issue.

Antonio, "Optimal Trajectory Planning for Spray Coating", TR-EE 93-29, Sep. 1993, 44 pgs.

Atkar et al., "Uniform Coverage of Simple Surfaces Embedded in R3 for Auto-Body Painting" 2004,16 pgs., Applicant points out, in accordance with MPEP 609.04(a), that the year of publication, 2004, is sufficiently earlier than the effective U.S. filing date, 2018 so that the particular month of publication is not in issue.

Byrd et al., "A Limited Memory Algorithm for Bound Constrained Optimization" May 1994, Technical Report NAM-08, 25 pgs.

Deng et al., "Application of robot offline programming in thermal spraying", Mar. 2012, Surface & Coatings Technology 206 (2012) 3875-3882, 8 pgs.

Gadow et al., "Optimizied robot trajectory generation for thermal spraying operations and high quality coatings on free-form surfaces", Sep. 2010, Surface & Coatings Technology 205 (2010) 1074-1079, 6 pgs.

Hegels et al., "Similation based iterative post-optimization of paths of robot guided thermal spraying" Mar. 2015, Robotics and Computer-Integrated Manufacturing 35 (2015) 1-15, 15 pgs.

Kout et al., "Parameter optimization for spray coating", Apr. 2009, Advances in Engineering Software 40 (2009) 1078-1086, 9 pgs.

Ramabhadran et al., "Fast Solution Techniques for a Class of Optimal Trajectory Planning Problems with Applications to Automated Spray Coating", TR-EE 95-9, Mar. 1995, 38 pgs.

Sadovoy, "Modeling and offline simulation of thermal spray coating process for gas turbine applications", 2014, 109 pgs., Applicant points out, in accordance with MPEP 609.04(a), that the year of publication, 2014, is sufficiently earlier than the effective U.S. filing date, 2018 so that the particular month of publication is not in issue.

Prosecution History from U.S. Appl. No. 16/054,651 dated Jun. 15, 2020 through Jan. 21, 2021, 30 pgs.

Prosecution History from U.S. Appl. No. 16/054,674 dated Jun. 12, 2020 through Jan. 21, 2021, 29 pgs.

Prosecution History from U.S. Appl. No. 16/054,705 dated Jun. 12, 2020 through Jan. 21, 2021, 28 pgs.

Prosecution History from U.S. Appl. No. 16/054,736 dated Jun. 15, 2020 through Jan. 25, 2021, 32 pgs.

U.S. Appl. No. 17/206,506, filed Mar. 19, 2021, by Bourne et al.
U.S. Appl. No. 17/206,547, filed Mar. 19, 2021, by Bourne et al.
U.S. Appl. No. 17/206,578, filed Mar. 19, 2021, by Bourne et al.

Office Action from U.S. Appl. No. 17/206,506, dated Dec. 21, 2021, 6 pp.

Office Action from U.S. Appl. No. 17/206,547, dated Jan. 13, 2022, 7 pp.

Office Action from U.S. Appl. No. 17/206,578, dated Jan. 13, 2022, 7 pp.

Notice of Allowance from U.S. Appl. No. 17/206,506, dated Apr. 26, 2022, 7 pp.

Response to Office Action dated Dec. 21, 2021, from U.S. Appl. No. 17/206,506, filed Mar. 11, 2022, 4 pp.

Response to Office Action dated Jan. 13, 2022, from U.S. Appl. No. 17/206,578, filed Apr. 13, 2022, 5 pp.

Response to Office Action dated Jan. 13, 2022, from U.S. Appl. No. 17/206,547, filed Apr. 13, 2022, 5 pp.

Notice of Allowance from U.S. Appl. No. 17/206,578, dated May 2, 2022, 7 pp.

Notice of Allowance from U.S. Appl. No. 17/206,547, dated Apr. 29, 2022, 7 pp.

* cited by examiner

ADAPTIVE CONTROL OF COATING THICKNESS

This application is a divisional of U.S. patent application Ser. No. 16/054,651 filed Aug. 3, 2018, which claims the benefit of U.S. Provisional Application No. 62/541,394, filed Aug. 4, 2017, and U.S. Provisional Application No. 62/541,397, filed Aug. 4, 2017, which are incorporated herein by reference in their entirety.

TECHNICAL FIELD

The present disclosure generally relates to systems and techniques for adaptive control of a thickness of a coating applied to a component.

BACKGROUND

The components of high-temperature mechanical systems, such as, for example, gas turbine engines, operate in severe environments. For example, the high-pressure turbine blades and vanes exposed to hot gases in commercial aeronautical engines typically experience surface temperatures of about 1000° C., with short-term peaks as high as 1100° C. Components of high-temperature mechanical systems may include a superalloy substrate, a ceramic substrate, or a ceramic matrix composite (CMC) substrate. In many examples, the substrates may be coated with one or more coatings to modify properties of the surface of the substrate. For example, superalloy substrates may be coated with a thermal barrier coating to reduce heat transfer from the external environment to the superalloy substrate. Ceramic or CMC substrates may be coated with an environmental barrier coating to reduce exposure of the ceramic or CMC substrate to environmental species, such as oxygen or water vapor. Additionally, certain components may include other functional coatings, such as, for example, bond coatings to improve adhesion between the substrate and adjacent coating layers, abradable coatings for forming seals between moving parts, abrasive coatings to provide toughness to moving components that may contact abradable coatings, or the like.

SUMMARY

In some examples, the disclosure describes a method that includes receiving, by a computing device, a geometry of a component that includes a plurality of locations on a surface of the component. The method also includes determining, by the computing device, a respective target thickness of a coating for each respective location of the plurality of locations based on a target coated component geometry and the geometry of the component. The method also includes determining, by the computing device, a number of passes of a coating device for each respective position of a plurality of positions of a coating program to achieve the respective target thickness for each respective location. The method may also include determining, by the computing device, a respective velocity of the coating device relative to the component for each respective position for each respective pass of the number of passes to achieve the respective target thickness for each respective location.

In some examples, the disclosure describes a system that includes a measuring device configured to measure a three-dimensional surface geometry of the component; a coating device configured to direct a coating material to a surface of the component to form the coating; and a computing device. The computing device is configured to receive, from the measuring device, a geometry of the component that includes a plurality of locations on a surface of the component. The computing device also is configured to determine a respective target thickness of the coating for each respective location of the plurality of locations based on a target coated component geometry and the geometry of the component. The computing device also is configured to determine a number of passes of the coating device for each respective position of a plurality of positions of a coating program to achieve the respective target thickness for each respective location.

The details of one or more examples are set forth in the accompanying drawings and the description below. Other features, objects, and advantages will be apparent from the description and drawings, and from the claims.

DETAILED DESCRIPTION

Figure 1:
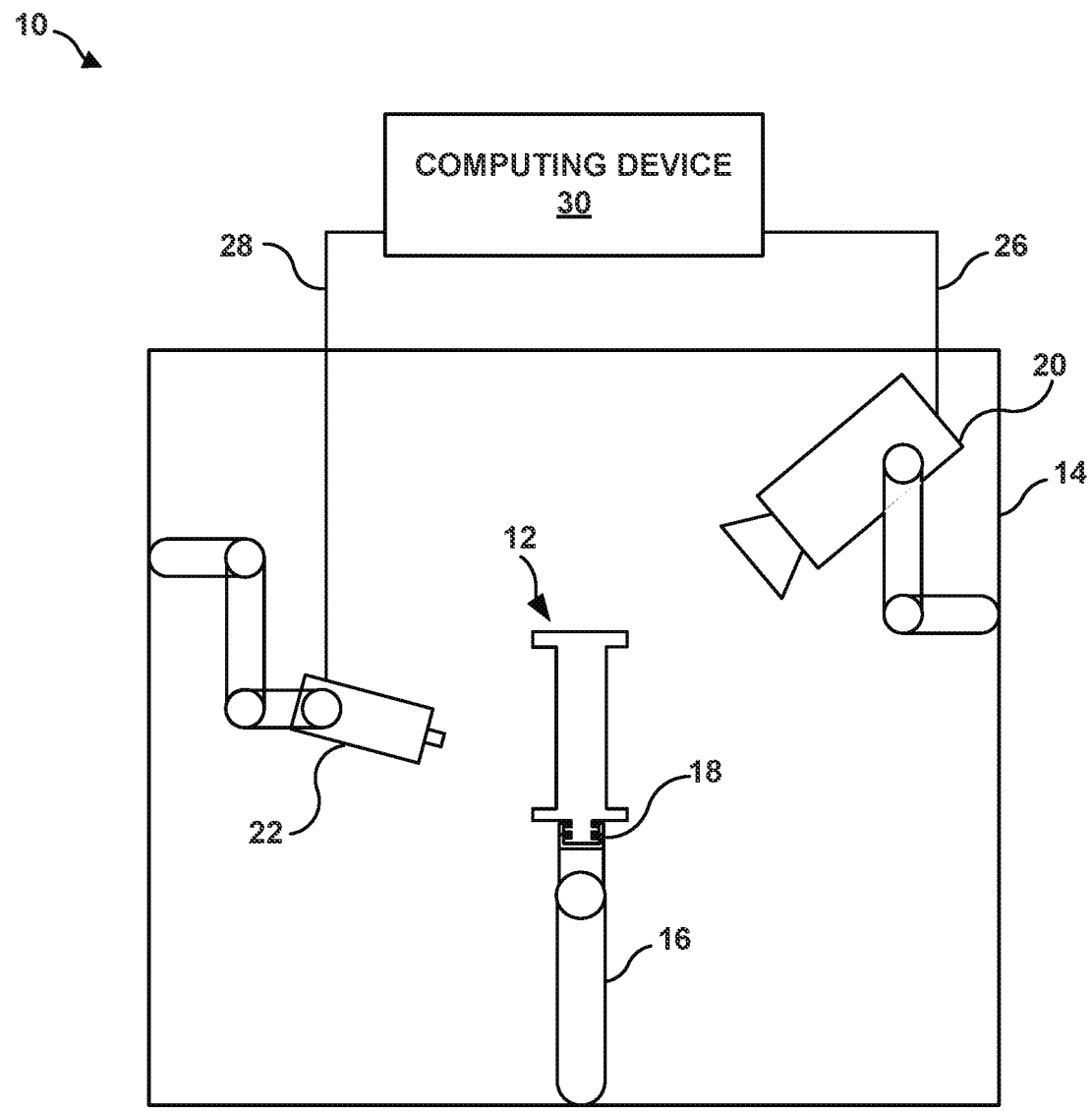
FIG. 1 is conceptual and schematic block diagram illustrating an example system for adaptive control of a thickness of a coating applied to a component.

The disclosure describes example systems and techniques for controlling a thickness of a coating applied to a component using a measuring device, a coating device, and a computing device. The computing device may receive a geometry of the component that includes a plurality of locations on the component. The computing device also may determine a target thickness of a coating for each respective location of the plurality of locations based on a target coated component geometry and the geometry of the component. Based on the target thickness of the coating for each respective location, the computing device also may determine a number of passes of a coating device for each respective position of a plurality of positions of a coating program. The computing device also may determine a respective velocity of the coating device for each respective position for each pass of the number of passes. By determining the respective numbers of passes, the respective velocities, or both, the computing device may determine a coating program for controlling the coating device to direct coating material to a surface of the component to substantially achieve the target thickness of the coating for each respective location of the plurality of locations. Further, in some examples, the computing device may modify only the number of passes and the velocities, which may facilitate formation of a coating with acceptable properties compared to if the computing device modified other parameters of the coating process.

The disclosure also describes example systems and techniques for adaptively determining spray law parameters used for a spray process to achieve a thickness of a coating applied to a component. The computing device may receive a first geometry of a component in an uncoated state and a second geometry of the component in a coated state. The computing device also may determine a first difference between the second geometry and a first simulated geometry, where the first simulated geometry may be based on the first geometry and a first spray law, and the first spray law may include at least one first spray law parameter. The computing device also may iteratively adjust at least one first spray law parameter to determine a subsequent spray law that includes a plurality of subsequent spray law parameters. The computing device also may iteratively determine a subsequent difference between the second geometry and a second simulated geometry, where the second simulated geometry is based on the first geometry and the subsequent spray laws. The computing device may select a subsequent spray law from the respective subsequent spray laws based on the respective subsequent differences. The computing device may control a coating process based on the selected subsequent spray laws. By controlling the coating process based on the selected subsequent spray laws, the computing device may at least partially correct for process drift (e.g., a change in the amount of coating accumulation for a given set of process parameters) that may occur in a coating process over time, for example, due to changes in the coating device or the like.

The components of high-temperature mechanical systems, such as, for example, gas turbine engines, may include a superalloy substrate, a ceramic substrate, a CMC substrate, or the like. These components may be manufactured to meet a geometric tolerance, for example, to withstand the mechanical forces of high-temperature mechanical systems or to fit with small gaps or spaces to adjacent components. For example, some gas turbine engine components, e.g., turbine blades, may be manufactured to meet a geometric tolerance to balance a compressor stage during operation or achieve relatively small gaps between a blade tip and a surrounding blade track or blade shroud. Achieving geometric tolerances may contribute to the performance of a high-temperature mechanical systems.

Also, components of high-temperature mechanical systems may include one or more coatings, for example, to facilitate operation in the high-temperature environment of high-temperature mechanical systems. For example, gas turbine engine components may include at least one of a bond coat, a calcia-magnesia-aluminosilicate (CMAS)-resistance layer, an environmental barrier coating (EBC), a thermal barrier coating (TBC), an abradable coating, an abrasive coating, or the like. Each of the one or more coatings may have unique mechanical properties, chemical properties, or both to contribute to the performance of a high-temperature mechanical system component. For example, EBCs may be reduce the migration into the substrate of elements or compounds, e.g., oxygen and water vapor, that may damage and reduce the useful life of the substrate.

Application of a coating to a surface of a component may affect a geometric tolerance of the component. For example, application of a coating may fill depressions in a surface to bring the surface closer to the geometric tolerance, or accumulate on peaks or crests to bring the surface further out of tolerance. Controlling a thickness of a coating directed to a surface of a component, where the surface is out of tolerance, such that the resulting coated component meets the geometric tolerance may reduce material waste, manufacturing time, and manufacturing expense compared to other coating methods, top coat machining methods, or both. Therefore, it may be useful to direct a coating of variable thickness to surface of a component to meet a geometric tolerance.

Also, during the repeated application of a coating to a plurality of components, a coating system may experience process drift. Process drift may be defined as a change over time in the amount of coating accumulation on the substrate surface for a given set of coating process parameters. Process drift may be a result of, for example, wear of the components of the coating system or variability in properties of a coating material. Adaptive control of a coating process may enable incremental adjustment of coating process parameters over time to at least partially correct for process drift. In some examples, reducing process drift may extend a useful life of the components of the coating system as the components wear, reduce the need to recalibrate equipment, or both. Increasing the useful life of the components or reducing equipment recalibration may reduce equipment down time, manufacturing expenses, or the like. In some examples, reducing process drift may account for variability in coating material properties between different coating material lots, such as, for example, coating material particle size, moisture, melting point, or the like. Accounting for variability in coating material properties between different lots may reduce equipment downtime, manufacturing expense, or the like.

The systems and techniques of the disclosure may enable adaptive control of coating thickness to meet a geometric tolerance, at least partially correct for process drift, or both. For example, the systems and techniques of the disclosure may control a thickness of a coating applied to a component by controlling a number of passes of a coating device over a surface of the component and a velocity of the coating device for each pass of the coating device. The systems and techniques of the disclosure may receive a measured geometry of the component and determine a target thickness of a coating for each respective location of the component geometry based on a target coated component geometry and the measured geometry. The systems and techniques of the disclosure may determine a number of passes of a coating device for each respective position of a plurality of positions on the surface of the component. The systems and techniques of the disclosure may determine a respective velocity of the coating device relative to the component for each respective position. In this way, the systems and techniques of the disclosure may be able to control a coating device to direct a coating material to a surface of the component to form a coating that is substantially equal to the target thickness for each respective location of the component.

Also, for example, the systems and techniques of the disclosure may adaptively determine spray law parameters used for a spray process to achieve a thickness of a coating applied to a component, e.g., to account for process drift. The systems and techniques of the disclosure may receive a first geometry of a component in an uncoated state and a second geometry of the component in a coated state. The systems and techniques of the disclosure may determine a first difference between the second geometry and a first simulated geometry that is based on the first geometry and a first spray law. The first spray law may include at least one respective first spray law parameter. The systems and techniques of the disclosure may compare the first difference to a predetermined threshold value. In response to the first difference exceeding the threshold, the systems and techniques of the disclosure may adjust at least one first spray law parameter to determine a plurality of second spray law parameters of a second spray law. The systems and techniques of the disclosure may determine a second difference between the second geometry and a second simulated geometry that is based on the first geometry and the second spray law. The systems and techniques of the disclosure may compare the second difference to the predetermined threshold value. The systems and techniques of the disclosure may repeat this process until the difference (e.g., between the second geometry and a subsequent simulated geometry) is within the predetermined threshold value or a change in the difference between one spray law and a subsequent spray law is less than a (different) predetermined threshold value. The systems and techniques of the disclosure may use the adjusted spray laws to coat additional components. The systems and techniques of the disclosure may repeat adjustment of the spray laws as needed to at least partially correct for process drift. In this way, the systems and techniques of the disclosure may at least partially correct for process drift by adaptively determining spray laws that represent the coating process.

FIG. 1 is a conceptual and schematic block diagram illustrating an example system 10 for adaptive control of a thickness of a coating applied on a component 12. Component 12 may include a superalloy substrate, a ceramic substrate, a CMC substrate, or the like. In some examples, component 12 may be a component of a high-temperature mechanical system, such as, for example, a gas turbine engine. Component 12 may include surface imperfection such as, for example, depressions, peaks, or crests relative to a desired plane of the surface of component 12. For example, surface imperfections may be created during manufacture of component 12 or due to wear of a surface of component 12 during operation of component 12.

System 10 may include an enclosure 14 defining a coating station. System 10 also may include stage 16, mount 18, measuring device 20, and coating device 22, which may be disposed within enclosure 14. Enclosure 14 may be any suitable size or shape to at least partially enclose component 12, stage 16, mount 18, measuring device 20, and coating device 22. In some examples, enclosure 14 may be sized or shaped to allow an operator to insert or remove any one or more of component 12, stage 16, mount 18, measuring device 20, and coating device 22 to and from enclosure 14. In some examples, enclosure 14 may be configured to maintain selected environment, e.g., a pressure or a gas composition different than atmospheric pressure or composition, around component 12. In some examples, enclosure 14 may include two or more enclosures. For example, a first enclosure may at least partially enclose at least measuring device 20, and a second enclosure may at least partially enclose at least coating device 22. System 10 also may include computing device 30, which may control operation of system 10, including, for example, at least one of stage 16, measuring device 20, or coating device 22.

Mount 18 may be configured to receive and detachably secure component 12, e.g., relative to measuring device 20 and coating device 22. For example, mount 18 may be shaped to receive a root section (e.g., fir tree section) of a turbine blade. Mount 18 may further include a clamp (e.g., spring clamp, bolt clamp, vise, or the like) or another fastener configured to detachably secure component 12 on stage 16.

Measuring device 20 may be configured to measure a three-dimensional surface geometry of component 12. For example, measuring device 20 may include a coordinate measuring machine ("CMM") (e.g., the CMM probe may be mechanical, optical, laser, or the like), a structured-light three-dimensional scanner, another non-contacting optical measurement device; digital image correlation, photogrammetry, or the like. In some examples, measuring device 20 may measure a variation in the surface of component 12 with a precision that is less than about 50 microns, less than about 25 microns, or less than about 10 microns. In other examples, measuring device 20 may measure a variation in the surface of component 12 with a precision that is less than a predetermined threshold value (e.g., a tolerance of a geometry of component 12).

Measuring device 20 may generate a data set including a plurality of values that define the surface of component 12. For example, the data set may include a plurality of tuples, such as a plurality of 3-tuples, where each tuple defines a point on the surface of component. Measuring device 20 may generate the data set with any selected format readable by computing device 30.

Coating device 22 may be configured to direct a coating material to a surface of component 12 to form a coating on the surface. Coating device 22 may include any suitable coating device, such as, for example, a thermal spray gun (e.g., a plasma spray gun, a detonation spray gun, a wire arc spray gun, a flame spray gun, a high velocity oxy-fuel (HVOF) spray gun, high velocity air fuel spray gun, a warm spray gun, a cold spray gun, or the like), a powder coating gun, a paint gun, or the like. In some examples, coating device 22 may direct a coating material to a surface of component 12 to deposit a layer of a coating, and may be controlled by computing device 30 to deposit multiple layers of the coating at a location of the surface over multiple passes of the coating device 22 over the location. In some examples, a layer of the coating may have a thickness that is less than a variation in the surface of component 12. For example, the predetermined variation may be a difference between the actual surface geometry of component 12 and a target surface geometry for component 12. In other examples, a layer of a coating may have a thickness that is less than a predetermined threshold value, such as a tolerance of a geometry of component 12, so that the coating may be used to compensate for deviations of the geometry of component 12 from the target geometry and arrive within the geometric tolerance for component 12. In some examples, a layer of a coating may have a thickness between about 0.1 mil (2.54 microns) to about 500 mil (1.27 centimeters), or about 0.5 mil (12.7 microns) to about 250 mil (6.35 millimeters), or about 0.8 mil (20.32 microns) to about 50 mil (1.27 millimeters).

Computing device 30 may include, for example, a desktop computer, a laptop computer, a tablet computer, a workstation, a server, a mainframe, a cloud computing system, a robot controller, or the like. Computing device 30 is configured to control operation of system 10 including, for example, at least one of stage 16, mount 18, measuring device 20, or coating device 22. Computing device 30 may be communicatively coupled to at least one of stage 16, mount 18, measuring device 20, or coating device 22 using respective communication connections. In some examples, the communication connection may include a network link, such as Ethernet or other network connections. Such connection may be wireless connection, a wired connection, or a combination of both. In some examples, the communications connections may include other types of device connections, such as, USB, IEEE 1394, or the like. For example, computing device 30 may be communicatively coupled to measuring device 20 via wired or wireless measuring device connection 26 and/or coating device 22 via wired or wireless coating device connection 28.

Although not shown in FIG. 1, system 10 may include one or more power sources. In some examples, one or more power source may be electrically coupled to each of computing device 30, measuring device 20, and coating device 22. In other examples, one or more power sources may be electrically coupled to computing device 30, which may be electrically coupled to each of measuring device 20 and coating device 22 via measuring device connection 26 and coating device connection 28, respectively.

Computing device 30 may be configured to control an operation of any one or more of stage 16, mount 18, measuring device 20, or coating device 22 to position component 12 relative to measuring device 20, coating device 22, or both. For example, computing device 30 may control any one or more of stage 16, mount 18, or measuring device 20 to translate and/or rotate along at least one axis to position component 12 relative to measuring device 20. Positioning component 12 relative to measuring device 20 may include positioning at least a portion of component 12 to be measured using measuring device 20 relative to measuring device 20. Similarly, computing device 30 may control any one or more of stage 16, mount 18, or measuring device 20 to translate and/or rotate along at least one axis to position component 12 relative to coating device 22. Positioning component 12 relative to coating device 22 may include positioning at least a portion of component 12 to be coated using coating device 22 relative to coating device 22.

Computing device 30 also may be configured to control an operation of coating device 22. In some examples, computing device 30 may control a coating material source to provide a coating material to coating device 22. The coating material may include, for example, a powder, such as a fluidized powder, e.g., a powder carried in a gas or liquid. In some examples, computing device 30 may control coating device 22 to accelerate particles, e.g., of the coating material, or a gas or liquid media, toward a surface of component 12. In some examples, computing device 30 may control coating device 22 to supply energy from an energy source to the coating material or the gas or liquid media. For example, computing device 30 may control coating device 22 to generate a plasma using a working gas and a voltage source or to generate a combustion reaction using a fuel and an oxidant. In some examples, computing device 30 may control coating device 22 to mix particles a coating or feedstock with a heated gas or liquid media, such as a plasma plume, a combustion gas, or the like. Computing device 30 may control coating device 22 to direct the coating material toward a surface of component 12, using by controlling a position, orientation, and movement of coating device 22 relative to component 12. Computing device 30 may control a position, orientation, and movement of coating device 22 to direct the coating material toward one or more locations on the surface of component 12.

In accordance with techniques of this disclosure, computing device 30 may be configured to control measuring device 20 to acquire a representation of the three-dimensional surface geometry (e.g., geometry) of component 12. For example, computing device 30 may control measuring device 20 to measure a geometry of component 12. The geometry of component 12 may include three-dimensional coordinates for a plurality of locations on component 12. In some examples, computing device 30 may control a mechanical or optical probe of measuring device 20 to scan or raster a surface of component 12 to acquire the geometry of component 12. In other examples, computing device 30 may control a plurality of optical elements of measuring device 20 to acquire a plurality of images of component 12. The plurality of images may be analyzed by computing device 30 or measuring device 20 to reconstruct the geometry of component 12. As discussed above, computing device 30 may be communicatively coupled to measuring device 20. In this way, computing device 30 may receive a geometry of component 12 from measuring device 20. Further, as described above, the geometry of component 12 may include a data set in any selected format, such as a plurality of tuples, representing the geometry of component 12.

In some examples, computing device 30 may be configured to control measuring device 20 to acquire respective geometries of each component of a plurality of components. For example, computing device 30 may control measuring device 20 to acquire a respective geometry of a plurality of geometries of a single component in a respective state of a plurality of states. Each state may be a different stage of a manufacturing process by which component 12 is formed. For example, a first state may be after casting, forging, additive manufacturing, or the like to form an uncoated substrate of component 12 and a second stage may be after forming a coating on a selected area of the substrate or all of the substrate. Other states are possible, depending on the manufacturing process used to form component 12. Also, computing device 30 may control measuring device 20 to acquire a respective geometry of a plurality of geometries of a respective component 12 of each component a plurality of components in a first state (e.g., an uncoated state, or a coated state, or both). The plurality of components may be components with the same or substantially similar geometry, or dissimilar geometry.

For example, computing device 30 may receive, from measuring device 20, data representative of a geometry of component 12. The geometry of component 12 may include three-dimensional coordinates of a plurality of locations on component 12. In some examples, the geometry may include a respective geometry of component 12 in a respective state of a plurality of states. For example, the geometry may include a first geometry of component 12 that may be in a first uncoated state. In other examples, the geometry may include a second geometry of component 12 in a second coated state. In other examples, the geometry may include a respective geometry of component 12 in a respective state of a plurality of states (e.g., as discussed above). In some examples, computing device 30 may receive, from measuring device 20, data representative of a respective geometry of a plurality of geometries of a respective component 12 of a plurality of components each in a respective state of a plurality of states.

Once computing device 30 receives the data representative of the geometry of component 12, in some examples, computing device 30 may determine a target thickness of a coating for each respective location of the plurality of locations of component 12 based on a target coated component geometry and a measured geometry of component 12. In some examples, the target coated component geometry may be a geometry of component 12 after completion of manufacturing (e.g., a final state of component 12). In other examples, the target coated component geometry may be a geometry of component 12 after an intermediate manufacturing state.

For example, computing device 30 may determine, for each respective location of the plurality of locations (which represent points on the surface(s) of component 12 (e.g., a respective x-, y-, z-axis coordinate in a three-coordinate system)), a difference between a measured geometry and a target geometry. Computing device 30 may use any suitable coordinate system to determine the target thickness (e.g., Cartesian coordinates, polar coordinates, cylindrical coordinates, spherical coordinates, or the like). In some examples, the difference may be the target thickness of a coating. In other examples, a portion of the difference may be the target thickness of a coating. For example, a first portion of the difference may be the target thickness of a first coating and a second portion of the difference may be the target thickness of a second coating, or the like.

In some examples, to facilitate determining the difference between the measured geometry and the target geometry for each location, computing device 30 may register the measured geometry to the target geometry. For example, component 12 may include a geometrical registration feature that computing device 30 uses to register the measured geometry of component 12 to the target geometry. The registration feature may be a dedicated registration feature (e.g., a feature that serves no useful purpose aside from registration) or an incidental registration feature (e.g., a functional feature of component 12 that can also be used as a registration feature). The registration feature may include, for example, a predetermined size, shape, orientation, or the like, to allow computing device 30 to accurately register the measured geometry to the target geometry.

Computing device 30 may be configured to determine the respective difference for each respective location of the plurality of locations in a direction substantially normal to the measured surface of component 12 at the respective location. By determining the respective differences in a direction substantially normal to the measured surface of component 12, computing device 30 may facilitate application of the coating to achieve the target geometry, as the coating device 22 may be oriented to result in the coating being applied in a direction substantially normal to the surface of component 12.

After determining the plurality of respective differences, computing device 30 may determine a number of passes that coating device 22 will travel over each position of a plurality of positions to deposit the target thickness of the coating at each location of component 12, a velocity that coating device 22 will travel over each position of the plurality of positions to deposit the target thickness of the coating at each location of component 12, or both. The plurality of positions may be associated with the plurality of locations. For example, the plurality of positions may be defined by a predetermined template coating program. The plurality of positions defined by the predetermined template coating program may correlate with one or more respective locations of the plurality of locations. In some examples, a respective position of the plurality of positions may include an area on a surface of the component that includes one or more of the determined plurality of locations. In some examples, the plurality of positions may include respective positions that are not located on the surface of the component. For example, the plurality of positions may include at least one simulated position near an edge of component 12 but not on the surface of component 12. The at least one simulated position may enable computing device 30 to control the movement, e.g., trajectory or velocity, of the coating device 22 near the edge of component 12. In some examples, each of the plurality of locations may directly correlate to a respective location of the plurality of locations. In some examples, computing device 30 may determine at least one coating device path, which defines the motion of coating device 22 relative to component 12 for coating at least a portion of component 12. The coating program for coating component 12 may include at least one coating device path, such as a plurality of coating device paths. A first respective path of the plurality of paths may direct coating device 22 to the same portion, different portions, or one or more overlapping portions of component 12, compared to other respective paths of the plurality of paths.

In some examples, computing device 30 may determine the number of passes for each position of the plurality of positions based on a predetermined template coating program. The predetermined template program may define the plurality of positions; parameters for a coating process, including, for example, orientation and position of coating device 22 relative to component 12 for each location of component 12, movements of coating device 22 relative to component 12, and acceleration of coating device 22 relative to component 12; spray parameters including, for example, a feed rate of coating material to coating device 22, a feed rate of a working gas to coating device 22, and the like; and other parameters that define the coating process. In some examples, the predetermined template program has been experimentally verified to produce a coating with acceptable characteristics (e.g., chemical properties, mechanical properties, or both). In some examples, each of these parameters may be fixed, and only the number of passes, and a velocity of coating device 22 relative to component 12 may be changed by computing device 20. By limiting changes to the predetermined template program to only the number of passes and the velocity of coating device 22, the resulting modified coating program may be more likely to produce an acceptable coating, e.g., than if other variables, such as material feed rate, distance from coating device 22 to component 12, or the like, were to be varied.

In some examples, the predetermined template program may include a plurality of subroutines. Each respective subroutine of the plurality of subroutines may define, relative to a respective position of the plurality of positions, at least one of a path of travel of coating device 22, a velocity of travel of coating device 22, an orientation of coating device 22, or the like. Further, each subroutine may include a plurality of moves of coating device 22 relative to component 12. For example, if component 12 includes a gas turbine engine blade, the predetermined template program may include a first subroutine for coating a tip of component 12, a second subroutine for coating a high-pressure face of component 12, a third subroutine for coating a low-pressure face of component 12, a fourth subroutine for coating a platform of component 12, and a fifth subroutine for coating a root of component 12. Other examples of components 12, and numbers and corresponding position for subroutines are also contemplated. The predetermined template program may include a respective number of passes for each subroutine, e.g., a respective number of times each respective subroutine may be executed by computing device 30.

The predetermined template program may be written in any suitable programming language (e.g., C/C++, Python, Java, C#/.NET, MATLAB, Assembly, Hardware Description Languages (HDLs), LISP, industrial robot languages, BASIC/Pascal, or the like). In some examples, computing device 30 may include a pre-processor that converts the predetermined template program language (e.g., robot code) to a robot-agonistic format.

Computing device 30 may be configured to adjust one or more parameters of the predetermined template program or parameters of a coating process to arrive at a coating program for applying a coating that substantially achieve the target geometry for component 12. For example, computing device 30 may determine a respective number of passes of coating device 22 for each location of component 12. In some examples, computing device 30 may determine a number of passes for each position of the plurality of positions by determining a respective number of times each respective subroutine of a predetermined template program is to be executed or performed (e.g., a subroutine count).

In some examples, computing device 30 may determine a velocity of coating device 22 relative to component 12 for each position of the plurality of positions. For example, in instances in which the coating program includes a plurality of subroutines and each subroutine includes at least one move of coating device 22, computing device 30 may determine a respective velocity for each respective move of coating device 22. In this way, in some examples, coating device 30 may determine a number of passes of coating device 22 with respect to each position of the plurality of positions, a velocity of coating device 22 with respect to each position of the plurality of positions, or both, in order to determine a coating program for applying a coating to substantially achieve the target geometry of component 12.

In some examples, computing device 30 may utilize a non-linear optimization technique to determine the number of passes, the velocity, or both. For example, computing device 30 may be configured to perform an optimization using the L-BFGS-B nonlinear optimization algorithm (a limited-memory Broyden-Fletcher-Goldfarb-Shanno approximation that handles bound constraints on variables). As part of the optimization technique, computing device 30 may execute a simulation of the coating process based on the measured geometry of component 12 and at least one spray law. A spray law outputs a prediction of a rate of coating accumulation at a location based on process conditions. The process conditions may include, for example, the position and orientation of coating device 22 relative to the location (e.g., in x-, y-, and z-coordinate system), the measured geometry of component 12 including, but not limited to, surface characteristics of component 12, such as curvature, and coating material already present at the location. The spray law may be empirically based. In some examples, each spray law may include at least one spray law parameter (e.g., may include a plurality of spray law parameters). In some examples, the spray law parameters may be associated with physical processes of the coating process. In other examples, the spray law parameters may be coefficients, exponents, or the like of one or more equations representing the coating process.

In some examples, a single coating process or a single subroutine of a coating process may be represented by a plurality of spray laws. For example, each position of the plurality of positions (and within a coating on component 12, if the coating is formed using multiple passes of spray device 22) may be associated with a respective spray law, which may be the same for all positions, may be different for at least some position than at least some other positions, or may be different for each position.

In some examples, a spray law may account for an amount of coating material present at a location. For example, coating material may accumulate at a location at a rate that depends in part on an amount of coating material present at the location. In some examples, as more coating material is present at a location, further coating material may accumulate at the location more quickly. In other examples, as more coating material is present at a location, further coating material may accumulate at the location more slowly. In either case, a spray law may include a variable representing a change in the rate of accumulation of a coating on component 12 as a function of coating material present at the location. The variable may be, for example, a multiplicative factor that is applied to the spray law based on the amount of coating material present at the location (e.g., the thickness of the coating material present at the location). As such, for a given location, computing device 30 may select a different spray law to represent accumulation of coating material at the given location for each pass of a plurality of passes. Because of this, the number of passes for a position, the velocity on a second or subsequent pass over the position, or both, may be based on an amount of coating applied at a location in one or more previous passes.

Computing device 30 may utilize at least one spray law (e.g., a plurality of spray laws) and the measured geometry of component 12 to determine a number of passes of coating device 22 for each respective position of the plurality of positions to achieve the target geometry by simulating the coating process using the at least one spray law. The result of the simulation may be a number of passes of coating device 22 for each respective position of the plurality of positions. In some examples, as described above, the velocity of coating device 22 is also a controllable variable, and computing device 30 may additionally determine a respective velocity relative to component 12 for each respective position of the plurality of positions.

In some examples, such as where the predetermined template coating program is divided into a number of subroutines, each subroutine including at least one movement of coating device 22, computing device 30 may determine the number of passes for each respective position of the plurality of positions by determining a number of executions of each subroutine. Similarly, in some examples, computing device 30 may determine the respective velocity relative to component 12 by determining a respective velocity for each movement of coating device 22.

In some examples, a plurality of sets of numbers of passes and velocities may approximately achieve the target geometry of component 12. To determine which of a plurality of possible sets of numbers of passes and velocities should be selected, computing device 30 may use an optimization program, such as the L-BFGS-B optimization program described above. For example, computing device 30 may determine the simulated component geometry created by the predetermined template coating program, the number of passes for each position of the plurality of positions, and the velocity for each position of the plurality of positions. Computing device 30 may then determine an error value of this component geometry compared to the target geometry. For example, computing device 30 may determine an average error value of the component geometry. In some examples, computing device may determine the average error value by squaring the error for each respective location, summing or averaging the squares of the error, and taking the square root of the sum.

Computing device 30 also may determine a total time for the coating process to be completed, and an acceleration experienced by coating device 22 during the coating process (e.g., acceleration due to starting and stopping motion for each movement of coating device 22). Computing device 30 may utilize at least one of the error value, the time, or the acceleration as inputs to the L-BFGS-B algorithm or another optimization algorithm, e.g., along with various parameters of the predetermined coating template program. The L-BFGS-B algorithm or other optimization algorithm may seek to reduce or minimize the objective function that is based on at least one of the error value, the time, or the acceleration. The L-BFGS-B algorithm may output new variables (e.g., number of passes for each location and velocity for each location), which may be inputs to the simulation. Computing device 30 may repeat this simulation and optimization until the objective function, and optionally, the Jacobian of the objective function is reduced below a threshold value, or a rate of change of the objective function and, optionally, the Jacobian of the objective function, is reduced to below a threshold value.

In some examples, during the determination of the number of passes and the velocity, for each position of the plurality of positions, one or more parameters of the predetermined template program may be constrained by bounds. For example, the respective velocity of coating device 22 may be constrained by a lower limit on the velocity and an upper limit on the velocity. The arrangement and relative spacing of the position of the plurality of positions may be constrained by a lower limit on the spacing of adjacent positions (e.g., an upper limit on position resolution) and an upper limit on the spacing of adjacent positions (e.g., a lower limit on position resolution). Bounds on one or more parameters of the predetermined template program may enable control of the adjusted program, e.g., the degree to which one or more parameters of the predetermined template program may be adjusted. Control of the adjusted program may enable an adjusted program to meet predetermined tolerance values.

In some examples, computing device 30 may perform a multi-step optimization routine to determine the number of passes and velocities. For example, computing device 30 may first determine a first respective number of passes of coating device 22 for each respective position of the plurality of positions. For example, in a first optimization, computing device 30 may allow the respective number of passes for each position to vary as a real number. In some examples, during the first optimization, computing device 30 also allows the velocity for each position to vary (e.g., within predetermined bounds). For example, computing device 30 may simulate a total coating accumulation as coating accumulation from a number of passes given by the integer portion of the number of passes plus coating accumulation from a single pass multiplied by the non-integer portion of the number of passes. After the first optimization converges, computing device 30 may round each respective number of passes to the nearest integer, e.g., may round each respective number of passes to the nearest greater integer. In this way, the respective number of passes for each position may be based on a respective velocity utilized during the first optimization.

In a second optimization, computing device 30 may use the rounded value of each respective number of passes to determine a respective velocity of coating device 22 for each respective position of the plurality of positions. In this way, the respective velocity of coating device 22 for each respective position of the plurality of positions may be based on the respective number of passes for each position of the plurality of positions.

Once computing device 30 has determined the respective number of passes for each position of the plurality of positions and the respective velocity for each position of the plurality of positions (e.g., the respective number of executions of each subroutine and the respective velocity for each movement of coating device 22), computing device 30 may control coating device 22 to coat component 12 based on the predetermined template coating program. For example, computing device 30 may control coating device 22 to direct a coating material to a surface of component 12 based on the determined numbers of passes and velocities. In this way, computing device 30 may be configured to coat the surface(s) of component 12 to substantially achieve a target thickness for each respective location of the plurality of locations on component 12.

The systems and techniques described herein also may be used to modify parameters of at least one spray law to account for changes in a coating process over time. For example, over a plurality of coating processes, a nozzle of coating device 22 may wear, which may cause the coating deposited with a set of coating parameters to change. To modify the parameters of at least one spray law, computing device 30 may determine a difference or set of differences between a first simulated geometry and a second, measured geometry of component 12 in a coated state. For example, computing device 30 may determine a respective difference for each respective location of the plurality of locations of the measured geometry of component 12. The first simulated geometry may be based on a first, measured geometry of component 12 in an uncoated state and a first spray law or a first plurality of spray laws. For example, computing device 30 may simulate coating accumulation on component 12 (e.g., to form the first simulated geometry) using the first spray law or the first plurality of spray laws and the first, measured geometry. As discussed above, the first spray law or each spray law of the first plurality of spray laws may include at least one respective first spray law parameter.

After simulating the coating process using the first, measured geometry and the first spray law or first plurality of spray laws, computing device may compare the first simulated geometry to the second, measured geometry (of component 12 is a coated state). Similar to the above discussion, computing device 30 may determine, for each respective location of the plurality of locations of the first, measured geometry of component 12 (e.g., a respective x-, y-, z-axis coordinate in a three-coordinate system), a respective difference between the second, measured geometry and the first simulated geometry. In this way, computing device 30 may compare a predicted or simulated thickness of a coating using the first spray law or first plurality of spray laws to an actual thickness of the coating on component 12.

In some examples, computing device 30 may determine whether the first spray law or the first plurality of spray laws represents the coating process sufficiently accurately. For example, computing device 30 may determine one or more differences representative of the difference in geometry between the first simulated geometry and the second, measured geometry of component 12. In some examples, computing device 30 may determine one value representative of the difference. For example, computing device 30 may determine a respective difference for each respective location of the second, measured geometry of component 12. Computing device then may manipulate those respective differences to arrive at a single value, e.g., by averaging the differences or squared differences, summing the differences or squared differences, or the like. The single value thus may be representative of the accuracy with which the first simulated geometry reflects the second, measured geometry of component 12. Computing device 30 may compare the single value to a predetermined threshold value to determine whether the accuracy with which the first simulated geometry reflects the second, measured geometry of component 12 is sufficient for determining coating programs for coating a component. For example, in response to the single value being less than the predetermined threshold value, computing device 30 may determine that the first spray law or first plurality of spray laws represents the coating process sufficiently accurately and may continue to use the first spray law or the first plurality of spray laws for subsequent coating processes. On the other hand, in response to the single value being greater than the predetermined threshold value, computing device 30 may determine that the first spray law or first plurality of spray laws does not represent the coating process sufficiently accurately and may proceed to adapt the first spray law or first plurality of spray laws.

In some examples, rather than determining a single value representative of the difference between the first simulated geometry and the second, measured geometry, computing device 30 may compare each respective difference associated with a location of the second, measured geometry of component 12 to a threshold difference value. Computing device 30 then may count a number of differences that exceed the threshold difference value, and compare this count to a threshold count number. In response to the count being less than the threshold count value, computing device 30 may determine that the first spray law or first plurality of spray laws represents the coating process sufficiently accurately and may continue to use the first spray law or the first plurality of spray laws for subsequent coating processes. On the other hand, in response to the count being greater than the threshold count value, computing device 30 may determine that the first spray law or first plurality of spray laws does not represent the coating process sufficiently accurately and may proceed to adapt the first spray law or first plurality of spray laws.

To adjust the first spray law or the first plurality of spray laws to more accurately represent the coating process, computing device 30 may adjust at least one first spray law parameter of the first spray law or the first plurality of first spray law parameters to determine a second spray law or a second plurality of spray law parameters. Computing device 30 then may determine a second simulated geometry based on the first, measured geometry and the second spray law or second plurality of spray laws. For example, similar to the discussion above with respect to the first simulated geometry, computing device 30 may simulate the second target geometry as the coating accumulation on component 12 using the second spray law or the second plurality of spray laws and the first geometry. Computing device 30 then may determine whether the second spray law or second plurality of spray laws represents the coating process with sufficient accuracy similar to process described above with respect to the first simulated geometry.

In some examples, computing device 30 may utilize an optimization algorithm to adjust the at least one first spray law parameter. For example, computing device 30 may utilize a nonlinear optimization algorithm, such as the L-BFGS-B nonlinear optimization algorithm, to reduce (e.g., minimize) an objective function whose inputs include one or more representations of the difference between the simulated geometry and the second, measured geometry. Similar to the process described above with respect to determining the number of passes and velocity, the L-BFGS-B algorithm may output new variables (e.g., one or more subsequent spray law parameters), which may be inputs to the simulation. For example, the L-BFGS-B algorithm inputs may include the objective function based on at least one first spray law parameter. The L-BFGS-B algorithm may adjust the at least one spray law parameter to reduce the objective function. Computing device 30 then may utilize the subsequent spray law and the first, measured geometry to determine a subsequent simulated geometry, and determine one or more values representative of differences between the second, measured geometry and the subsequent simulated geometry. The one or more values representative of differences between the second, measured geometry and the subsequent simulated geometry are then inputs to the L-BFGS-B nonlinear optimization algorithm, by which computing device 30 determines a value of an objective function, optionally, a value of a Jacobian of the objective function, and updated spray law parameters. Computing device 30 may repeat this simulation and optimization until the objective function, and optionally, the Jacobian of the objective function is reduced below a threshold value, or a rate of change of the objective function and, optionally, the Jacobian of the objective function, is reduced to below a threshold value. In this way, the L-BFGS-B nonlinear optimization algorithm may be used to minimize the difference between the simulated geometry and the second, measured geometry.

In some examples, throughout the optimization or iteration technique, coating device 30 may maintain the number of passes of coating device 22 for each respective location and the velocity of coating device 22 with respect to component 12 for each respective location constant, as these parameters are based on the actual coating process performed to coat the component 12 and achieve the second, measured geometry.

Computing device 30 may iterate this technique until a value of the objective function is less than a threshold value or a rate of change in the objective function from one iteration to the next is less than a threshold value. Once a value of the objective function is less than a threshold value or a rate of change in the objective function from one iteration to the next is less than a threshold value, computing device 30 may determine that the most recent spray law or most recent plurality of spray laws represents the coating process with sufficient accuracy. Computing device 30 then may utilize the most recent spray law or most recent plurality of spray laws in future coating processes, e.g., to determine a number of passes and velocities for further coating processes.

In some examples, computing device 30 may utilize measurements associated with a plurality of components to at least partially correct for process drift. For example, similar to the above discussion, computing device 30 may determine one or more values representative of difference between a respective subsequent simulated geometry and a respective second, measured geometry of component 12 for each respective component of a plurality of components. Computing device 30 may determine a combination, such as an average, of the plurality of differences. In some examples, computing device 30 may determine a mean of the plurality of differences. In other examples, computing device 30 may determine a weighted average of the plurality of differences. For example, computing device 30 may assign a relative weight to each of the plurality of differences. In some examples, the relative weight may be based on the order in which each of the respective components of the plurality of components were coated by coating device 22. For example, a difference associated with a more recently coated component may be assigned a higher relative weight than a difference associated with a less recently coated component. In some examples, similar to the above discussion, computing device 30 may compare the average of the plurality of differences to the predetermined threshold value or utilize the average as an input to the optimization algorithm, such as the L-BFGS-B algorithm. By using differences associated with a plurality of components, computing device 30 may at least partially correct for process drift in coating device 22. In some examples, differences associated with a plurality of components, computing device 30 may more accurately at least partially correct for process drift in coating device 22, compared to using only difference associated with only one component. For example, using differences associated with a plurality of components may reduce effect of an outlier component, thus providing a more stable coating process.

In some examples, computing device 30 may repeat the at least partial correction for process drift at regular or irregular intervals. For example, computing device 30 may determine a subsequent spray law or a plurality of subsequent spray laws after controlling coating device 22 to coat about 10 components, about 100 components, about 1,000 components, or the like. Computing device 30 may then use the subsequent spray law or the plurality of subsequent spray laws to control coating device 22 to coat another about 10 components, about 100 components, about 1,000 components, or the like. In some examples, the regular or irregular intervals may occur during a sequential coating of a plurality of components. In this way, computing device 30 may adaptively control a thickness of a coating of a plurality of components.

Figure 2:
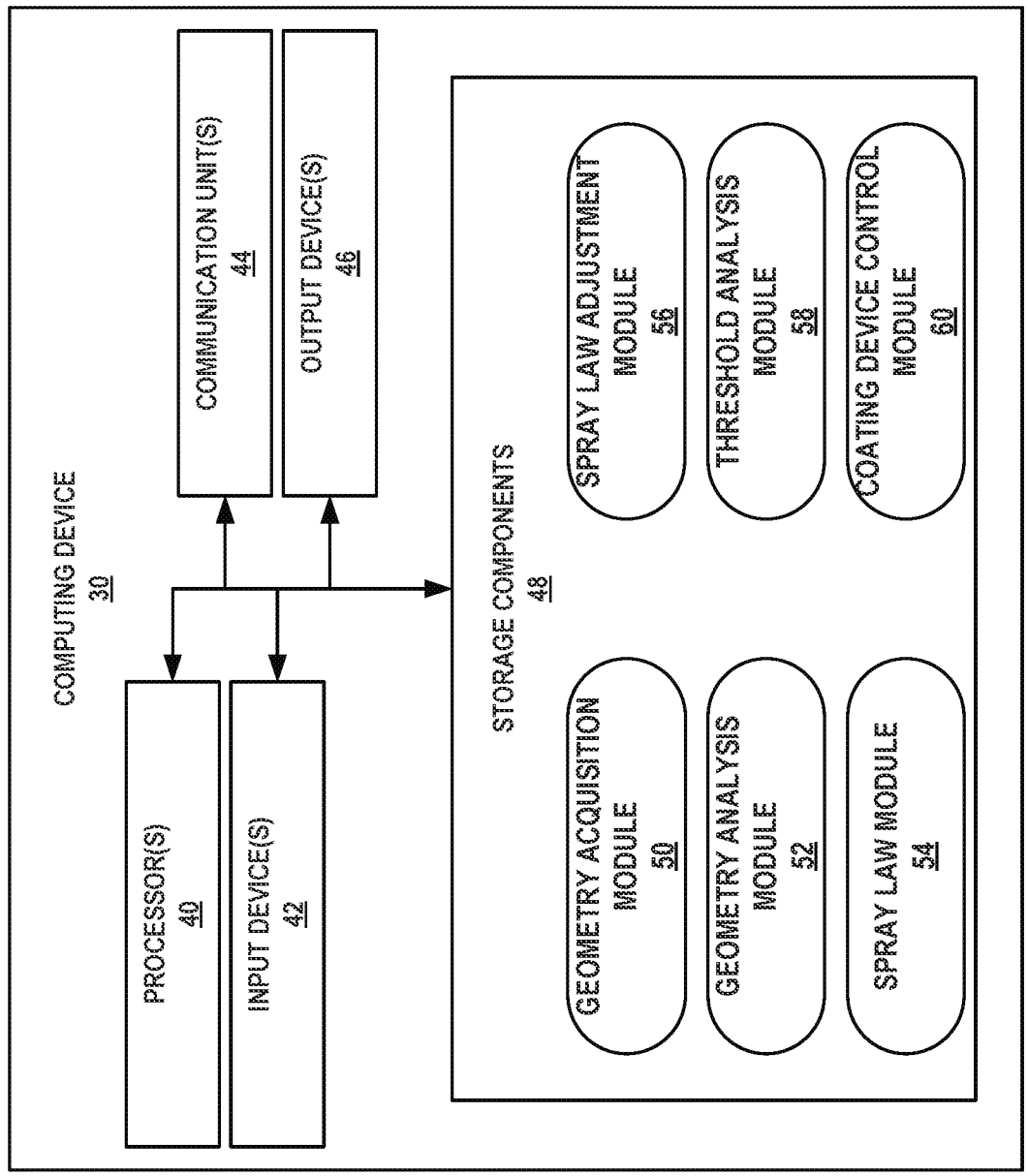
FIG. 2 is a conceptual and schematic block diagram illustrating an example of the computing device illustrated in FIG. 1.

FIG. 2 is a conceptual and schematic block diagram illustrating an example of computing device 30 illustrated in FIG. 1. In the example of FIG. 2, computing device 30 includes one or more processors 40, one or more input devices 42, one or more communication units 44, one or more output devices 46, and one or more one or more storage components 48. In some examples, one or more storage components 48 includes geometry acquisition module 50, geometry analysis module 52, spray law module 54, spray law adjustment module 56, threshold analysis module 58, and coating device control module 60. In other examples, computing device 30 may include additional components or fewer components than those illustrated in FIG. 2. In some examples, computing device 30 may include a simulation module configured to query spray law module 54 and perform simulated coating procedures, a spray program adjustment module configured to update the spray programs based on an optimization algorithm as described above, or both. In other words, some of the functions attributed to modules described herein may performed by other modules, functions attributed herein to different modules may be accomplished by fewer modules than described, or the like.

One or more processors 40 are configured to implement functionality and/or process instructions for execution within computing device 30. For example, processors 40 may be capable of processing instructions stored by one or more storage components 48. Examples of one or more processors 40 may include, any one or more of a microprocessor, a controller, a digital signal processor (DSP), an application specific integrated circuit (ASIC), a field-programmable gate array (FPGA), or equivalent discrete or integrated logic circuitry.

Computing device 30 also includes one or more input devices 42. Input devices 42, in some examples, are configured to receive input from a user through tactile, audio, or video sources. Examples of input devices 42 include a mouse, a keyboard, a voice responsive system, video camera, microphone, touchscreen, or any other type of device for detecting a command from a user.

Computing device 30 further includes one or more communication units 44. Computing device 30 may utilize communication units 44 to communicate with external devices (e.g., stage 16, mount 18, measuring device 20, and/or coating device 22) via one or more networks, such as one or more wired or wireless networks. Communication unit 44 may be a network interface card, such as an Ethernet card, an optical transceiver, a radio frequency transceiver, or any other type of device that can send and receive information. Other examples of such network interfaces may include WiFi™ radios or USB. In some examples, computing device 30 utilizes communication units 44 to wirelessly communicate with an external device such as a server.

Computing device 30 may further include one or more output devices 46. Output devices 46, in some examples, are configured to provide output to a user using audio or video media. For example, output devices 46 may include a display, a sound card, a video graphics adapter card, or any other type of device for converting a signal into an appropriate form understandable to humans or machines.

One or more storage components 48 may be configured to store information within computing device 30 during operation. One or more storage components 48, in some examples, include a computer-readable storage medium or computer-readable storage device. In some examples, one or more storage components 48 include a temporary memory, meaning that a primary purpose of one or more storage components 48 is not long-term storage. One or more storage components 48, in some examples, include a volatile memory, meaning that one or more storage components 48 does not maintain stored contents when power is not provided to one or more storage components 48. Examples of volatile memories include random access memories (RAM), dynamic random-access memories (DRAM), static random-access memories (SRAM), and other forms of volatile memories known in the art. In some examples, one or more storage components 48 are used to store program instructions for execution by processors 40. One or more storage components 48, in some examples, are used by software or applications running on computing device 30 to temporarily store information during program execution.

In some examples, one or more storage components 48 may further include one or more storage components 48 configured for longer-term storage of information. In some examples, one or more storage components 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 30 also may include geometry acquisition module 50, geometry analysis module 52, spray law module 54, spray law adjustment module 56, threshold analysis module 58, and coating device control module 60. Each of geometry acquisition module 50, geometry analysis module 52, spray law module 54, spray law adjustment module 56, threshold analysis module 58, and coating device control module 60 may be implemented in various ways. For example, one or more of geometry acquisition module 50, geometry analysis module 52, spray law module 54, spray law adjustment module 56, threshold analysis module 58, and coating device control module 60 may be implemented as an application or a part of an application executed by one or more processors 40. In other examples, one or more of geometry acquisition module 50, geometry analysis module 52, spray law module 54, spray law adjustment module 56, threshold analysis module 58, and coating device control module 60 may be implemented as part of a hardware unit of computing device 30 (e.g., as circuitry). Functions performed by one or more of geometry acquisition module 50, geometry analysis module 52, spray law module 54, spray law adjustment module 56, threshold analysis module 58, and coating device control module 60 are explained below with reference to the example flow diagrams illustrated in FIGS. 3 and 4.

Computing device 30 may include additional components that, for clarity, are not shown in FIG. 2. For example, computing device 30 may include a power supply to provide power to the components of computing device 30. Similarly, the components of computing device 30 shown in FIG. 2 may not be necessary in every example of computing device 30.

Figure 3:
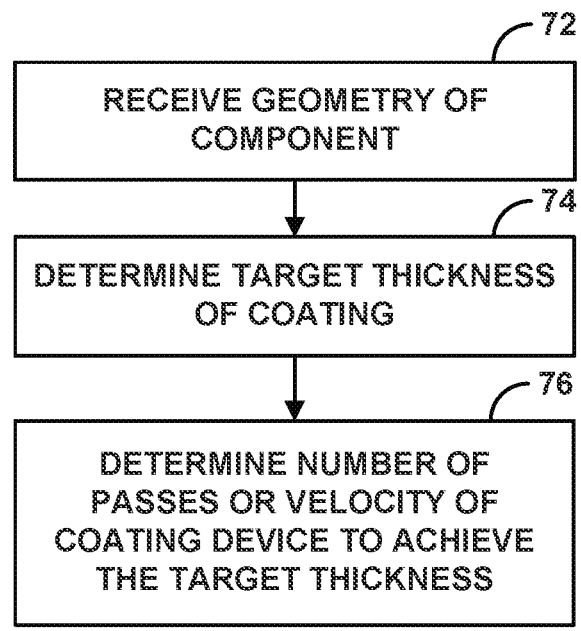
FIG. 3 is a flow diagram of an example technique for controlling a thickness of a coating applied to a component.

FIG. 3 is a flow diagram of an example technique for controlling a thickness of a coating applied to a component 12. Although the technique of FIG. 3 will be described with respect to system 10 of FIG. 1 and computing device 30 of FIG. 2, in other examples, the technique of FIG. 3 may be performed using a different system, a different computing device, or both. Additionally, system 10 and computing device 30 may perform other techniques for controlling a thickness of a coating applied to a component.

In some examples, although not shown in FIG. 3, the technique may include controlling, by computing device 30, for example, geometry acquisition module 50, a position of any one or more of stage 16, mount 18, measuring device 20, and coating device 22 to position component 12 relative to measuring device 20, coating device 22, or both. For example, computing device 30 and, more particularly, geometry acquisition module 50, may control any one of stage 16, mount 18, or measuring device 20 to translate and/or rotate along at least one axis to position component 12 relative to measuring device 20. Computing device 30 may store, in one or more storage components 48, an initial position of any one or more of stage 16, mount 18, measuring device 20, and coating device 22 to facilitate repeatable measuring of a geometry of component 12 in a respective state of a plurality of states (e.g., as discussed above), registration of the measured geometry of component 12 to a target geometry, or both. As discussed above, each respective component 12 of the plurality of components may include a superalloy component, a ceramic component, or a CMC component.

The technique illustrated in FIG. 3 includes receiving, by computing device 30, for example, geometry acquisition module 50, data representative of the three-dimensional surface geometry (e.g., geometry) of component 12 from measuring device 20 (72). For example, the geometry of component 12 may include three-dimensional coordinates of a plurality of locations on component 12 in a respective state of a plurality of states or each component of a plurality of components.

After receiving the data representative of the geometry of component 12, the technique illustrated in FIG. 3 includes determining, by computing device 30, for example, geometry analysis module 52, a respective target thickness of a coating for each respective location of the plurality of locations on component 12 (74). In some examples, the respective target thickness may be based on a target coated component geometry and a measured geometry of the component. For example, similar to the discussion above, the technique may include determining, by the computing device 30 and, more particularly, geometry analysis module 52, for each respective location of the plurality of locations (which represent points on the surface(s) of component 12 (e.g., a respective x-, y-, z-axis coordinate in a three-coordinate system)), a difference between a measured geometry and a target geometry. In some examples, determining the respective target thickness of the coating for each respective location of the plurality of locations on component 12 (74) may include registering, by computing device 30, for example, geometry analysis module 52, the measured geometry to the target geometry, to facilitate determining the differences between the measured geometry and the target geometry for each location. In some examples, computing device 30, for example, geometry analysis module 52, may determine the respective difference for each respective location of the plurality of locations in a direction substantially normal to the measured surface of component 12 at the respective location.

After determining the target thickness, the technique illustrated in FIG. 3 may include determining, by computing device 30, for example, spray law module 54 (or a simulation module), a number of passes that coating device 22 will travel over each position of the plurality of positions (e.g., defined by a predetermined template coating program) to deposit the target thickness of the coating at each location of component 12, a velocity that coating device 22 will travel over each position of the plurality of positions to deposit the target thickness of the coating at each location of component 12, or both (76). For example, computing device 30, for example, spray law module 54 (or a simulation module), may determine at least one coating device path, which defines the motion of coating device 22 relative to component 12 for coating at least a portion of component 12. The coating program for coating component 12 may include at least one coating device path, such as a plurality of coating device paths. A first respective path of the plurality of paths may direct a coating material to the same portion, different portions, or one or more overlapping portions of component 12, compared to other respective paths of the plurality of paths.

In some examples, determining the number of passes or velocity that coating device 22 will travel over each position of the plurality of positions to deposit the target thickness of the coating at each location of component 12 (76) may include determining, by computing device 30, for example, spray law module 54, may determine the number of passes at each position based on a predetermined template coating program. In some examples, the predetermined template program may define the plurality of positions and parameters for a coating process, which may be experimentally verified. In some examples, each of these parameters may be fixed, and only the number of passes and the velocity of coating device 22 relative to component 12 may be changed by computing device 20. In some examples, the predetermined template program may include a plurality of subroutines. In some examples, the predetermined template program may be written in any suitable programming language (e.g., C/C++, Python, Java, C#/.NET, MATLAB, Assembly, Hardware Description Languages (HDLs), LISP, industrial robot languages, BASIC/Pascal, or the like).

In some examples, computing device 30, for example, spray law adjustment module 56 (or spray law program adjustment module), may adjust one or more parameters of the predetermined template program or parameters of a coating process to arrive at a coating program for applying a coating to substantially achieve the target geometry for component 12. For example, computing device 30, for example, spray law module 54, may determine a respective number of passes of coating device 22 for each position of the plurality of positions. In some examples, computing device 30, for example, spray law module 54, may determine a number of passes for each position of the plurality of positions by determining a respective number of times each respective subroutine of a predetermined template program is to be executed or performed (e.g., a subroutine count).

In some examples, determining the number of passes or velocity that coating device 22 will travel over each position of the plurality of positions to deposit the target thickness of the coating at each location of component 12 (76) may include determining, by computing device 30, for example, spray law module 54, a velocity of coating device 22 relative to component 12 for each respective position of the plurality of positions. For example, in instances in which the coating program includes a plurality of subroutines and each subroutine includes at least one move of coating device 22, computing device 30, for example, spray law module 54, may determine a respective velocity for each respective move of coating device 22. In this way, in some examples, the technique may include determining, by computing device 30, for example, spray law module 54, a number of passes of coating device 22 with respect to each position of the plurality of positions, a velocity of coating device 22 with respect to each position of the plurality of positions, or both, in order to determine a coating program for applying a coating to substantially achieve the target geometry of component 12.

In some examples, computing device 30, for example, spray law adjustment module 56, may utilize a non-linear optimization technique to determine the number of passes, the velocities, or both. For example, computing device 30, for example, spray law adjustment module 56, may perform an optimization using the L-BFGS-B nonlinear optimization algorithm (a limited-memory Broyden-Fletcher-Goldfarb-Shanno approximation that handles bound constraints on variables). In some examples, part of the optimization may include executing, by computing device 30, for example, spray law adjustment module 56, a simulation of the coating process based on the measured geometry of component 12 and at least one spray law.

In some examples, determining the number of passes or velocity that coating device 22 will travel over each position of the plurality of positions to deposit the target thickness of the coating at each location of component 12 (76) may include utilizing, by computing device 30, for example, spray law module 54, the at least one spray law (e.g., a plurality of spray laws) and the measured geometry of component 12 to determine a number of passes of coating device 22 for each respective position of the plurality of positions to substantially achieve the target geometry by simulating the coating process using the at least one spray law, to determine a velocity of coating device 22 for each respective position of the plurality of positions to substantially achieve the target geometry by simulating the coating process using the at least one spray law, or both. In some examples, such as where the predetermined template coating program is divided into a number of subroutines, each subroutine including at least one movement of coating device 22, the technique may include determining, by computing device 30, for example, spray law module 54, the number of passes for each respective position of the plurality of positions by determining a number of executions of each subroutine. Similarly, in some examples, the technique may include determining, by computing device 30, for example, spray law module 54, the respective velocity relative to component 12 by determining a respective velocity for each movement of coating device 22.

In some examples, during the optimization process, computing device 30, for example, spray law module 54, may select a different spray law to represent accumulation of coating material at a given location for each pass of a plurality of passes. For example, a respective spray law may be associated with each respective location of the plurality of locations of the measure geometry of component 12.

After determining the respective number of passes for each position and the respective velocity for each position (e.g., the respective number of executions of each subroutine and the respective velocity for each movement of coating device 22), the technique may include controlling, by computing device 30, for example, coating device control module 54, control coating device 22 to coat component 12 based on the predetermined template coating program. For example, computing device 30 may control coating device 22 to direct a coating material to a surface of component 12 based on the plurality of positions and the determined numbers of passes and velocities. In this way, computing device 30 may be configured to coat the surface(s) of component 12 to substantially achieve a target thickness for each respective location of the plurality of locations on component 12.

Figure 4:
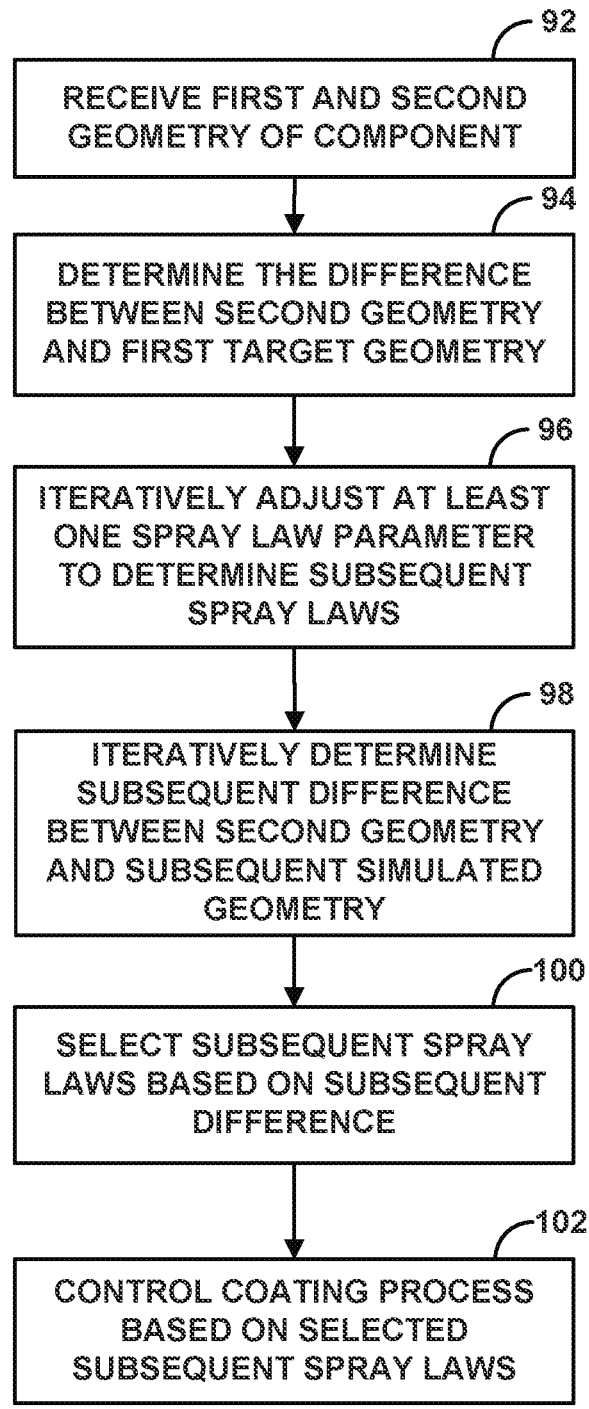
FIG. 4 is a flow diagram of an example technique for adaptively determining spray law parameters used for a spray process to achieve a thickness of a coating applied to a component.

FIG. 4 is a flow diagram of an example technique for adaptively determining spray law parameters used for a spray process to achieve a thickness of a coating applied to component 12. Although the technique of FIG. 4 will be described with respect to system 10 of FIG. 1 and computing device 30 of FIG. 2, in other examples, the technique of FIG. 4 may be performed using a different system, different computing device, or both. Additionally, system 10 and computing device 30 may perform other techniques for adaptively controlling a thickness of a coating applied to a component 12.

The technique illustrated in FIG. 4 includes receiving, by computing device 30, for example, geometry acquisition module 50, a first, measured geometry of component 12 in a first state (e.g., an uncoated state) and a second, measured geometry of component 12 in a subsequent state (e.g., a coated state) (92). Receiving the first geometry and second geometry of component 12 may be the same or substantially similar as described above with respect to FIG. 3, except that each of the first geometry and second geometry may include a respective geometry of a plurality of geometries of component 12 in a respective state of a plurality of states.

The technique illustrated in FIG. 4 includes determining, by computing device 30, for example, geometry analysis module 52, a respective first difference between a first simulated geometry and a second, measured geometry in a coated state (94). Each respective first difference may correspond to a respective location of the plurality of locations of the measured geometry of component 12. The first simulated geometry may be based on a first, measured geometry of component 12 in an uncoated state and a first spray law or a first plurality of spray laws. For example, computing device 30, for example, spray law module 54 (or a simulation module), may simulate coating accumulation on component 12 using the first spray law or the first plurality of spray laws and the first, measured geometry. As discussed above, the first spray law or each spray law of the first plurality of spray laws may include at least one respective first spray law parameter.

After simulating the coating process using the first, measured geometry and the first spray law or first plurality of spray laws, the technique may include comparing, by computing device 30 and, more particularly, geometry analysis module 52, the first simulated geometry to the second, measured geometry. For example, the technique may include determining, by computing device 30 and, more particularly, geometry analysis module 52, for each respective location of the plurality of locations of the first, measured geometry of component 12 (e.g., a respective x-, y-, z-axis coordinate in a three-coordinate system), a respective difference between the second, measured geometry and the first simulated geometry.

In some examples, although not illustrated in FIG. 4, the technique may include determining, by computing device 30, for example threshold analysis module 58, whether the first spray law or the first plurality of spray laws represents the coating process sufficiently accurately. For example, computing device 30, for example threshold analysis module 58, may utilize the one or more differences representative of the difference in geometry between the first simulated geometry and the second, measured geometry of component 12. In some examples, computing device 30, for example threshold analysis module 58, may determine one value representative of the difference. In some examples, computing device 30, for example threshold analysis module 58, may manipulate the respective differences to arrive at a single value, as described above. For example, computing device 30, for example, threshold analysis module 58, may compare the single value to a predetermined threshold value to determine whether the accuracy with which the first simulated geometry reflects the second, measured geometry of component 12 is sufficient for determining coating programs for coating another component. In other examples, computing device 30, for example threshold analysis module 58, may compare each respective difference associated with a location of the second, measured geometry of component 12 to a threshold difference value. Computing device 30, for example, threshold analysis module 58, may count a number of differences that exceed the threshold difference value, and compare this count to a threshold count number.

The technique illustrated in FIG. 4 also includes iteratively adjusting, by computing device 30, for example, spray law adjustment module 56, at least one first spray law parameter of the first spray law or the first plurality of first spray law parameters to determine a subsequent spray law or a subsequent plurality of spray law parameters (96). In some examples, the subsequent spray law or the subsequent plurality of spray law parameters may more accurately represent the coating process. After determining the second spray laws, although not illustrated in FIG. 4, the technique includes determining, by computing device 30, for example, spray law module 54 (or simulation module), a subsequent simulated geometry based on the first, measured geometry and the subsequent spray law or subsequent plurality of spray laws.

After determining the subsequent simulated geometry, the technique may include determining, by computing device 30, for example, spray law module 54 (or simulation module), whether the subsequent spray law or subsequent plurality of spray laws represents the coating process with sufficient accuracy, similar to the process described above with respect to the first simulated geometry. For example, the technique illustrated in FIG. 4 includes iteratively determining, by computing device 30 and, more particularly, geometry analysis module 52, a respective subsequent difference between the second geometry and a subsequent simulated geometry (98).

In some examples, the technique includes utilizing, by computing device 30 and, more particularly, spray law adjustment module 54, an optimization algorithm to adjust the at least one first spray law parameter and determine the subsequent spray law or the subsequent plurality of spray laws. As discussed above, the optimization algorithm may include, for example, a nonlinear optimization algorithm, such as the L-BFGS-B nonlinear optimization algorithm, to reduce (e.g., minimize) an objective function whose inputs include one or more representations of the difference between the simulated geometry and the second, measured geometry. In some examples, the technique may include iteratively adjusting a spray law to determine a subsequent spray law and iteratively determining a respective subsequent difference until a value of the objective function is less than a threshold value or a rate of change in the objective function from one iteration to the next is less than a threshold value.

Once a value of the objective function is less than a threshold value or a rate of change in the objective function from one iteration to the next is less than a threshold value, computing device 30, for example, threshold analysis module 58, may select a subsequent spray law from the respective subsequent spray laws based on the respective subsequent differences (100). For example, the technique may include determining, by computing device 30, for example, threshold analysis module 58, that the most recent spray law or most recent plurality of spray laws represents the coating process with sufficient accuracy.

After selecting a subsequent spray law or subsequent spray laws that represent the coating process with sufficient accuracy, the technique illustrated in FIG. 4 includes controlling, by computing device 30, for example, coating device control module 58, a coating process based on the selected subsequent spray law (102). For example, computing device 30, for example, coating device control module 58, may utilize the most recent spray law or most recent plurality of spray laws in future coating processes, e.g., to determine a number of passes and velocities for further coating processes.

In some examples, the technique of FIG. 4 may include utilizing, by computing device 30, for example, coating device control module 58, measurements associated with a plurality of components to at least partially correct for process drift. For example, similar to the above discussion in reference to FIG. 1, computing device 30, for example, geometry analysis module 52, may determine one or more values representative of a difference between a respective subsequent simulated geometry and a respective second, measured geometry of component 12 for each respective component of a plurality of components. Computing device 30, for example, geometry analysis module 52, then may determine a combination, such as an average, a mean, a weighted average, of the plurality or differences. Computing device 30, for example, geometry analysis module 52, may compare the combination of the plurality of differences to the predetermined threshold value or utilize the average as an input to the optimization algorithm, such as the L-BFGS-B algorithm. By using differences associated with a plurality of components, the technique may at least partially correct for process drift in coating device 22.

In some examples computing device 30, may repeat the technique of FIG. 4 at regular or irregular intervals. For example, by computing device 30, may repeat the technique of FIG. 4 after controlling coating device 22 to coat a particular number of components (e.g., about 10 components, about 100 components, about 1,000 components, or the like) or after controlling coating device 22 to coat components over a particular duration (e.g., a number of hours, such as, less than about one hour, about 10 hours, or the like; a number of days, such as, about one day, about one week, or the like). In this way, the technique of FIG. 4 allows computing device 30 to adaptively determine spray law parameters used for a spray process to achieve a thickness of a coating of a plurality of components.

Various examples have been described. These and other examples are within the scope of the following claims.

What is claimed is:

1. A system comprising:
a measuring device configured to measure a three-dimensional surface geometry of a component;

a coating device configured to direct a coating material to a surface of the component to form a coating; and a computing device configured to:
receive, from the measuring device, a geometry of the component, the geometry comprising a plurality of locations on a surface of the component;
determine a respective target thickness of the coating for each respective location of the plurality of locations based on a target coated component geometry and the geometry of the component;
determine a number of passes of the coating device for each respective position of a plurality of positions of a coating program to achieve the respective target thickness for each respective location; and
determine a respective velocity of the coating device relative to the component for each respective position for each respective pass of the number of passes to achieve the respective target thickness for each respective location.

2. The system of claim 1, wherein the computing device is further configured to control the coating device based on the determined number of passes and the respective velocities.

3. The system of claim 1, wherein:
the number of passes comprises at least a first pass and a second pass,
the respective velocities comprise at least a first velocity and a second velocity, and
at least one of the second pass or the second velocity, for a respective position is based at least in part on an amount of the coating applied at a respective location on the first pass at the first velocity.

4. The system of claim 1, wherein the number of passes or the respective velocities are based on a respective spray law of a plurality of spray laws.

5. The system of claim 4, wherein each respective spray law is based on at least one of an amount of the coating applied at each respective location on one or more previous passes, the position of the coating device relative to each respective location, the orientation of the coating device relative to each respective location, a predetermined number of passes of the coating device, or a predetermined velocity of the coating device.

6. The system of claim 1, wherein the computing device is configured to determine the number of passes by at least:
determining, by the computing device, for each coating subroutine of a plurality of coating subroutines, a respective coating subroutine count, wherein the coating subroutine count indicates the number of times the coating subroutine is to be performed, wherein
each respective subroutine of the plurality of subroutines defines a path of travel of the coating device, a velocity of travel of the coating device, and an orientation of the coating device for coating a portion of the component.

7. The system of claim 6, wherein the computing device is configured to determine, for each coating subroutine of the plurality of coating subroutines, the respective coating subroutine count by at least:
determining, by the computing device, for each respective movement of at least one respective movement within each coating subroutine, a respective velocity.

8. The system of claim 1, wherein the component comprises a ceramic component or a ceramic matrix composite (CMC) component.

9. The system of claim 1, wherein the computing device is configured to determine the number of passes by at least reducing a value of an objective function based on at least one of a total error of respective differences between the target coated component geometry and the geometry of the component for each location, a time to form the coating, or a total acceleration experienced by the coating device while applying the coating.

* * * * *